(12) United States Patent
Kawamura et al.

(10) Patent No.: US 12,215,968 B2
(45) Date of Patent: Feb. 4, 2025

(54) ANGLE MEASUREMENT DEVICE AND METHOD

(71) Applicant: Nippon Telegraph and Telephone Corporation, Tokyo (JP)

(72) Inventors: Sohan Kawamura, Tokyo (JP); Takashi Sakamoto, Tokyo (JP); Masahiro Ueno, Tokyo (JP); Yuichi Akage, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 260 days.

(21) Appl. No.: 17/925,415

(22) PCT Filed: May 19, 2020

(86) PCT No.: PCT/JP2020/019754
§ 371 (c)(1),
(2) Date: Nov. 15, 2022

(87) PCT Pub. No.: WO2021/234812
PCT Pub. Date: Nov. 25, 2021

(65) Prior Publication Data
US 2023/0184544 A1    Jun. 15, 2023

(51) Int. Cl.
*G01B 11/26* (2006.01)
(52) U.S. Cl.
CPC .................... *G01B 11/26* (2013.01)
(58) Field of Classification Search
CPC ........ G01B 11/26; G01B 11/272; G01C 1/00; G01C 1/02; G01C 1/04; G01C 9/00;
(Continued)

(56) References Cited

U.S. PATENT DOCUMENTS

2003/0071995 A1* 4/2003 Kurata ................... G01B 11/26
356/364

FOREIGN PATENT DOCUMENTS

JP          3336584 B2    10/2002
JP     2005172704 A  *  6/2005
(Continued)

OTHER PUBLICATIONS

D. Mitrenga, M. Schaedel, S. Voellmeke, K. Preuss and C. Moeller, "Tiny Incident Light Angle Sensor," MikroSystem Technik 2017; Congress, Munich, Germany, 2017, pp. 1-4. This art discloses using a specially designed position censor to allow for the calculation of incident angle of the light (Year: 2017).*

(Continued)

*Primary Examiner* — Uzma Alam
*Assistant Examiner* — Jonathon Cook
(74) *Attorney, Agent, or Firm* — Slater Matsil, LLP

(57) ABSTRACT

An angle measurement device according to the present invention relates to an angle measurement device for measuring an incident angle of an incident light ray, and includes: at least one light deflector; a driving power supply; a light receiver; and a calculation unit. The light deflector is of a transmission type, has an electro-optic effect, and is configured to change an optical path of the light ray by a voltage applied from the driving power supply, and cause the light ray to enter the light receiver. The calculation unit is configured to calculate the incident angle based on the voltage at which an intensity of the light ray detected by the light receiver is maximum.

12 Claims, 13 Drawing Sheets

(58) Field of Classification Search
CPC .............. G01C 2009/066; G01J 1/0242; G01J 2001/061; G01N 2203/0682
See application file for complete search history.

(56) References Cited

FOREIGN PATENT DOCUMENTS

| | | |
|---|---|---|
| JP | 2016017915 A | 2/2016 |
| JP | 2018072097 A | 5/2018 |
| JP | 2018105796 A | 7/2018 |

OTHER PUBLICATIONS

Jakubaszek, M., Wojtanowski, J., Zygmunt, M., and Młodzianko, A., "Sensor of light incidence angle", in *Laser Technology 2018: Progress and Applications of Lasers*, 2018, vol. 10974, Art. No. 109740H. doi:10.1117/12.2516649 (Year: 2018).*

* cited by examiner

ANGLE MEASUREMENT DEVICE AND METHOD

CROSS-REFERENCE TO RELATED APPLICATIONS

This application is a national phase entry of PCT Application No. PCT/JP2020/019754, filed on May 19, 2020, which application is hereby incorporated herein by reference.

TECHNICAL FIELD

The present invention relates to an angle measurement device for measuring an incident angle of an incident light ray, and a method thereof.

BACKGROUND

The best known example of angle measurement devices is a level that is used in construction of large structures such as buildings, interior renovation, and the like. As is well known, such a level is a device that includes a transparent container filled with liquid, and measures an angle of a target structure relative to a horizontal plane. Thus, a level is a passive measurement device that uses an interaction between liquid and gravity.

Also, a light detection and ranging (LiDAR) device that is mounted on, for example, an automobile, and the like are widely known as optical angle measurement devices. Such a device employs a technology in which emitted laser light is scanned, an interference signal between reflected light of the laser light and reference light is used to measure a distance, and an image is formed based on information regarding the distance, and serves as a device for measuring an angle between suitable two points in the image.

Also, for example, a device for measuring an inclination angle of an object is disclosed in PTL 1 as an optical angle measurement device. In this device, by irradiating an object with light and detecting a two-dimensional distribution of reflected light using a light receiver, an inclination angle of the object is measured.

Thus, an optical angle measurement device needs to measure an incident angle of light (the reflected light in the cases of the above-described devices) that enters a light detection unit from the outside. As a device for measuring an incident angle, for example, a device as shown in FIG. 12 is conceivable that includes a reflective-type optical component 101 and a planar (two-dimensional) light receiver 102 for outputting information regarding a light receiving position, and is configured to guide light having entered a measurement device from the outside to the light receiver, and measure the incident angle of a light ray based on a position at which the light ray is detected.

Also conceivable is a device as shown in FIG. 13 that includes a transmission-type optical component 111 and a light receiver 112 for outputting information regarding a light receiving position, and is configured to guide light having entered a measurement device from the outside to the light receiver, and calculate the incident angle of a light ray based on a position at which the light ray is detected.

CITATION LIST

Patent Literature

[PTL 1] Japanese Patent No. 3336584.

SUMMARY

Technical Problem

However, the above-described angle measurement devices requires both a mechanical driving unit for optical components and a light receiver that outputs information regarding a light detection position, in order to measure an angle of incidence from any light source. Thus, the angle measurement devices described above are difficult to downsize and operate at high speeds.

It is also difficult to measure angles of a plurality of point light sources at high speed.

Means for Solving the Problem

To solve the above-described problems, the angle measurement device according to embodiments of the present invention relates to an angle measurement device for measuring an incident angle of an incident light ray, comprising: at least one light deflector; a driving power supply; a light receiver; and a calculation unit, wherein the light deflector is of a transmission type, has an electro-optic effect, and is configured to change an optical path of the light ray by a voltage applied from the driving power supply, and cause the light ray to enter the light receiver, and the calculation unit is configured to calculate the incident angle based on the voltage at which an intensity of the light ray detected by the light receiver is maximum.

Also, the angle measurement method according to embodiments of the present invention relates to an angle measurement method for measuring an incident angle of an incident light ray, using a transmission-type light deflector that has an electro-optic effect, the method including: a step of applying a voltage to the light deflector to change an optical path of the light ray; a step of measuring an intensity of the light ray at a predetermined position; a step of obtaining a peak voltage at which the intensity is maximum; and a step of calculating the incident angle based on the peak voltage.

Effects of Embodiments of the Invention

According to embodiments of the present invention, it is possible to provide an angle measurement device and method that can operate at high speed and can be downsized.

DETAILED DESCRIPTION OF ILLUSTRATIVE EMBODIMENTS

First Embodiment

An angle measurement device according to a first embodiment of the present invention will be described with reference to FIGS. 1 to 4.

<Configuration of Angle Measurement Device>

Figure 1:
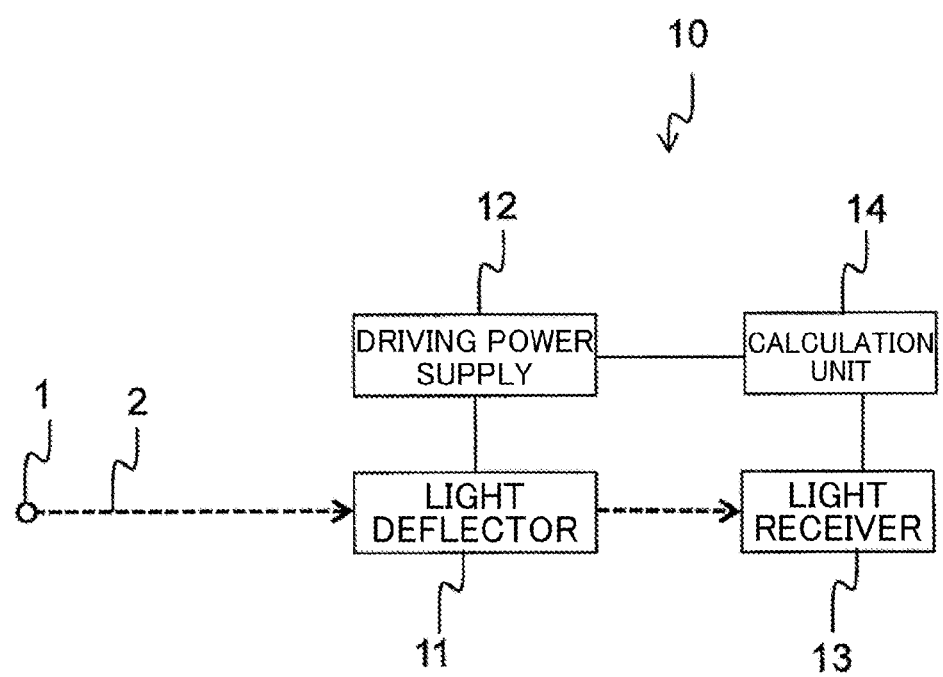
FIG. 1 is a block diagram illustrating a configuration of an angle measurement device according to a first embodiment of the present invention.

FIG. 1 shows a configuration of an angle measurement device 10 according to the first embodiment. The angle measurement device includes a light deflector 11, a driving power supply 12, a light receiver 13, and a calculation unit 14.

The light deflector 11 is of a transmission type, and controls a light ray 2 that is incident from a measurement target (light source) 1. The driving power supply 12 drives the light deflector 11. The light receiver 13 detects light transmitted through the light deflector 11. The calculation unit 14 calculates an incident angle based on the voltage of the driving power supply 12 and the intensity detected by the light receiver 13.

Here, the light deflector 11 may be a lens or a prism, which serves as a conventional transmission-type light deflector. However, because, for these optical components, an output angle of transmitted light is uniquely determined with respect to the incident angle of the light ray 2, a mechanical driving component for the optical component, a two-dimensional light receiver that can acquire information regarding a light detection position, and the like are required to correspond to a suitable incident angle. Accordingly, it is not possible to realize the downsizing of the angle measurement device and the high-speed operation thereof.

In the present embodiment, the transmission-type light deflector 11 uses potassium tantalate niobate (KTa1−xNbxO3; hereinafter abbreviated as "KTN"), which has an electro-optic effect. The "electro-optic effect" refers to a phenomenon in which the refractive index of a substance changes when a voltage is applied. Therefore, the light ray 2 that passes through the light deflector 11 is subjected to refractive index modulation in the light deflector 11 and is deflected, and the optical path of the light ray 2 changes so that the light ray 2 is guided to the light receiver. As a result, it is possible to guide the light ray 2 to the light receiver 13 that is fixed to a predetermined position and has a simple configuration such that it does not output information regarding a light detection position, regardless of the incident angle of the light ray 2.

Thus, the angle measurement device 10 according to the present embodiment can be downsized and can operate at high speed, with the use of KTN for the light deflector 11. The operation principle will be described in detail below.

<Operation Principle of Angle Measurement Device>

Figure 2:
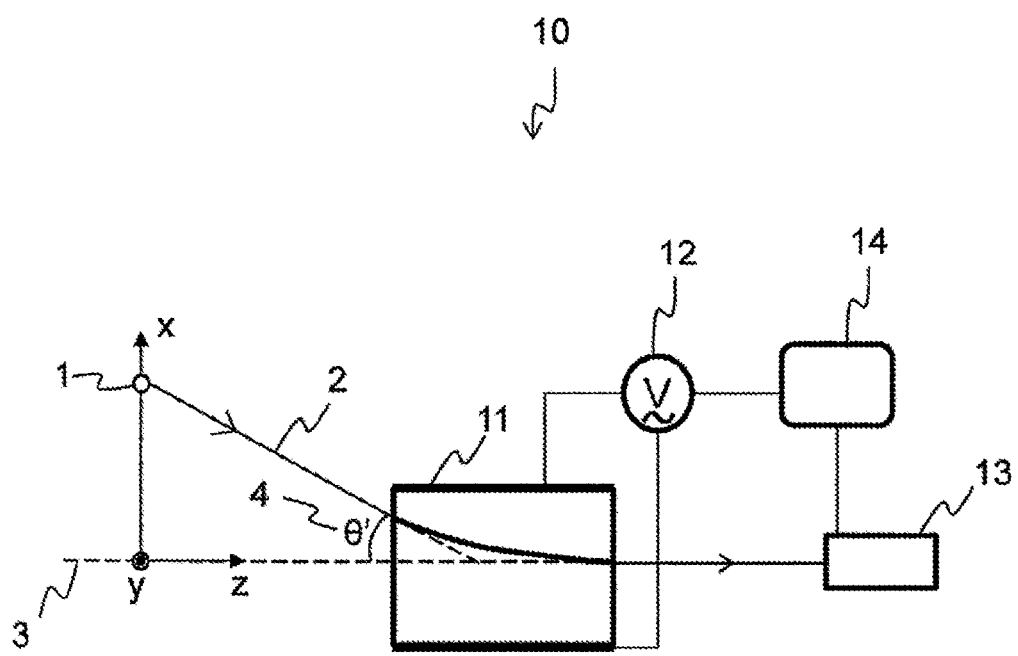
FIG. 2 is a schematic diagram illustrating the angle measurement device according to the first embodiment of the present invention.
Figure 3:
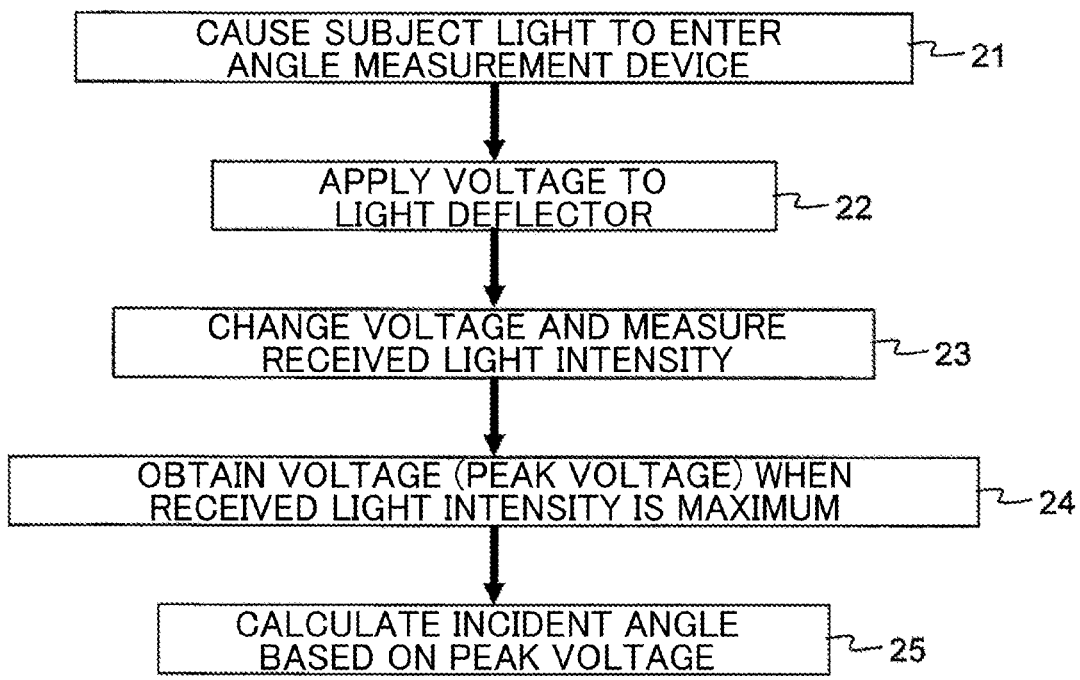
FIG. 3 is a flowchart of an angle measurement method according to the first embodiment of the present invention.

FIG. 2 is a schematic diagram showing the angle measurement device 10 according to the present embodiment. FIG. 3 is a flowchart of an angle measurement method according to the present embodiment.

The light deflector 11 and the light receiver 13 are arranged in parallel to a horizontal plane such that an exit opening of the light deflector 11 and an entrance opening (light receiving window) of the light receiver 13 are located on substantially the same optical axis 3. Accordingly, an angle θ'4 at which the light ray 2 from the light source 1 is incident on the light deflector 11 is an incident angle with respect to the horizontal direction.

Hereinafter, the terms "substantially the same" include an expression "completely the same" and include, if there is a slight difference, a case where there is a difference of about 2 to 3 degrees from the optical axis 3, or a case where there is a difference of about 0.2 to 0.3 mm. If such a difference is included, the difference will lead to a measurement error. Accordingly, the terms "substantially the same" include a case where there is a difference from the optical axis 3 within an allowable measurement error range.

First, subject light is caused to enter the angle measurement device (step 21). In FIG. 2, the light ray 2 generated from the point light source 1 provided at a suitable point on the x axis enters the light deflector 11 at the angle θ'4 with respect to the z axis that is the optical axis 3. If no voltage is applied to the light deflector 11, the light ray 2 hardly changes its optical path and exits at the angle θ' with respect to the z axis.

Then, the voltage is applied to the light deflector 11 by the driving power supply 12. Due to the application of the voltage, the light ray 2 changes its optical path, and the angle of exit of the light ray 2 is changed (step 22).

The light deflector 11 uses KTN. KTN has an electro-optic effect, and the refractive index of KTN changes when a voltage is applied.

Here, KTN exhibits the Kerr effect in which a refractive index changes in proportion to the square of an applied voltage. KTN particularly has a large relative permittivity and thus the Kerr effect is significant (Koichiro Nakamura, Jun Miyazu, Yuzo Sasaki, Tadayuki Imai, Masahiro Sasaura, and Kazuo Fujiura, "Space-charge-controlled electro-optic effect: Optical beam deflection by electro-optic effect and space-charge-controlled electrical conduction", J. Appl. Phys. 104, 013105 (2008)).

Therefore, as shown in the following expression (1), the light ray 2 incident on the KTN light deflector 11 can be caused to exit at an angle θ with respect to the optical axis 3 (z axis), and the angle θ changes in proportion to the square of an applied voltage.

Equation 1

$$\theta \cong L\frac{d}{dx}\Delta n(x) = -\frac{9}{8}n^3 s_{ij}\frac{L}{d}E_0^2 \qquad (1)$$

Where L is the length of the light deflector 11 in the direction of the optical axis 3, and Δn(x) is the amount of change in the refractive index along the x axis. Also, n is the refractive index of KTN, sij is an electro-optical coefficient, d is the thickness of a KTN crystal in the x-axis direction (perpendicular to the optical axis 3 and parallel to the paper plane) in FIG. 2, and Eo is an electric field when no space-charge effect occurs within the KTN crystal, and depends on the applied voltage.

Figure 4:
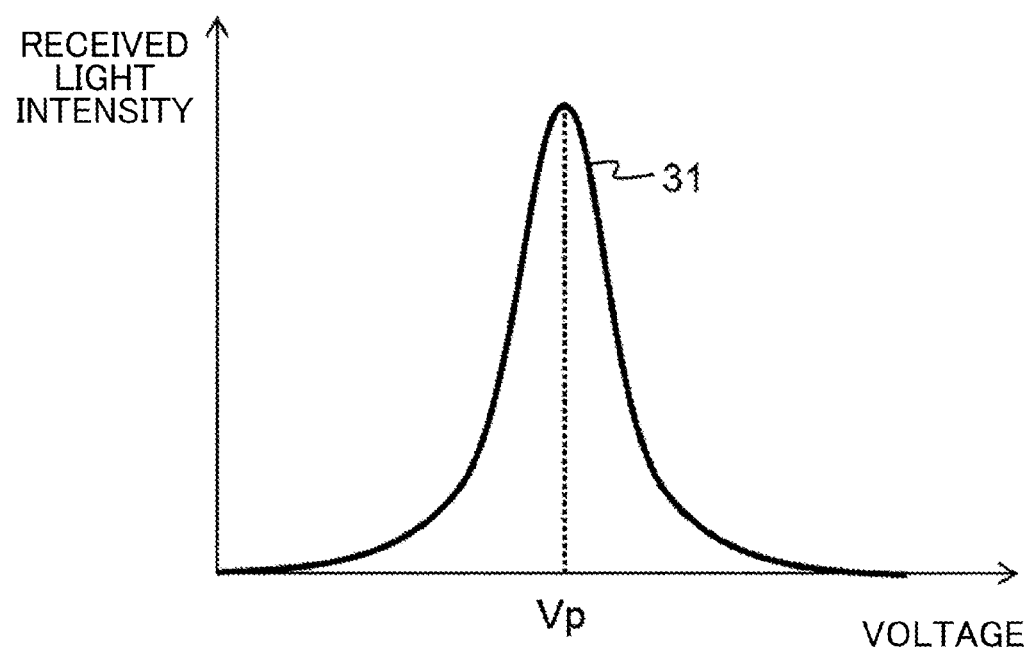
FIG. 4 is a typical diagram illustrating a peak observed by a light receiver of the angle measurement device according to the first embodiment of the present invention.

Then, by changing the voltage, the optical path of the light ray 2 changes so as to be aligned with the z axis, and the light ray 2 is guided to the light receiver 13 provided on the z axis. Therefore, when the voltage is changed and the received light intensity is measured, a peak 31 is observed as shown in FIG. 4 (step 23).

The calculation unit 14 calculates the incident angle θ'4 based on a voltage value (peak voltage) Vp at this time (steps 24 to 25). For the calculation of the incident angle θ'4, it is sufficient to use the applied voltage dependence of an angle of light that is deflected by the KTN light deflector 11, the angle being obtained in advance by the expression (1) or through actual measurement.

Here, the KTN light deflector 11 can change the angle of deflection in response to an alternating voltage of 200 kHz, and thus can measure an angle at high speed (at about 0.01 milliseconds).

Also, since, in the angle measurement device 10, the light deflector 11 can be used to guide light to the light receiver 13, a planar (two-dimensional) light receiver 13 is not needed. As a result, a downsized light receiver 13 can be used, and the light receiver 13 may have a light receiving window of about 500 μm.

Thus, the angle measurement device 10 according to the present embodiment uses a downsized light deflector 11 and a downsized light receiver 13, without requiring any rotational mechanism for an optical element and any planar (two-dimensional) light detector, realizing a reduction in the entire length of the device to about 10 mm to 20 mm.

As described above, according to the angle measurement device 10 of the present embodiment, it is possible to perform high-speed measurement of an incident angle with a simple configuration, and downsize the device.

Modification 1 of First Embodiment

Figure 5:
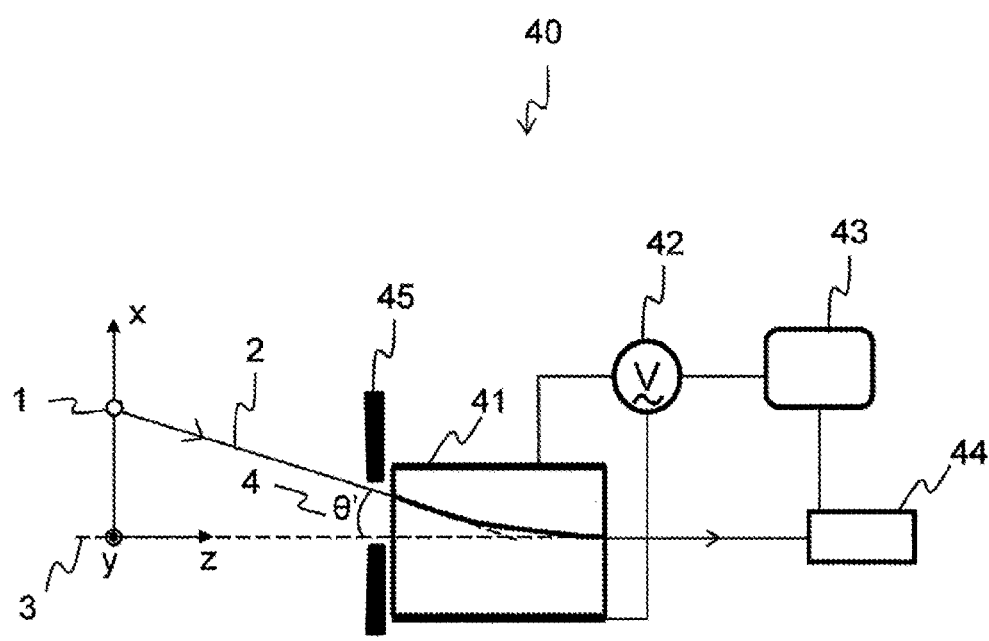
FIG. 5 is a schematic diagram illustrating an angle measurement device according to a modification of the first embodiment of the present invention.

FIG. 5 is a schematic diagram showing an angle measurement device 40 according to a modification. The angle measurement device 40 has substantially the same configuration as that of the angle measurement device 10 according to the first embodiment, and includes a baffle plate 45 in front of the entrance opening of a light deflector 41 (on the side on which the light source of incident light is arranged).

The angle measurement device 40 can reduce, using the baffle plate 45, ambient noise cause by scattering light, and can improve the measurement accuracy.

Modification 2 of First Embodiment

Figure 6:
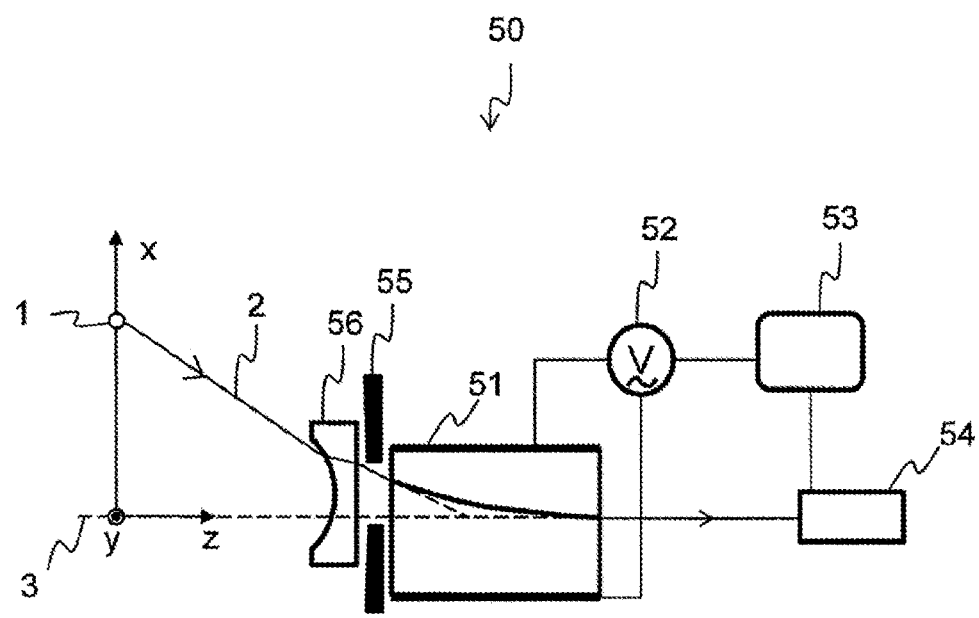
FIG. 6 is a schematic diagram illustrating an angle measurement device according to another modification of the first embodiment of the present invention.

FIG. 6 is a schematic diagram showing an angle measurement device 50 according to a modification. The angle measurement device 50 has substantially the same configuration as that of the angle measurement device 10 according to the first embodiment, and includes a baffle plate 55 as well as a concave lens 56 in front of the entrance opening of a light deflector 51 (on the side on which the light source of incident light is arranged).

In the angle measurement device 10 according to the first embodiment, the angle of deflection of the KTN light deflector 11 is limited to about 8 degrees, and thus there is a limitation in the measurable incident angle (solid angle). The angle measurement device according to the present modification uses the concave lens, and thus the incident angle (solid angle) can be increased to about 15 degrees.

Also, with a combination of the baffle plate and the concave lens, it is possible to increase the incident angle (solid angle) and reduce noise.

Although the present modification has described an example in which a baffle plate and a concave lens are used in combination, the incident angle (solid angle) can be increased only by using the concave lens.

Second Embodiment

An angle measurement device 60 according to a second embodiment of the present invention will be described with reference to FIGS. 7 to 10. The angle measurement device 60 according to the second embodiment measures angles of light rays emitted from a plurality of point light sources.

<Configuration of Angle Measurement Device>

Figure 7:
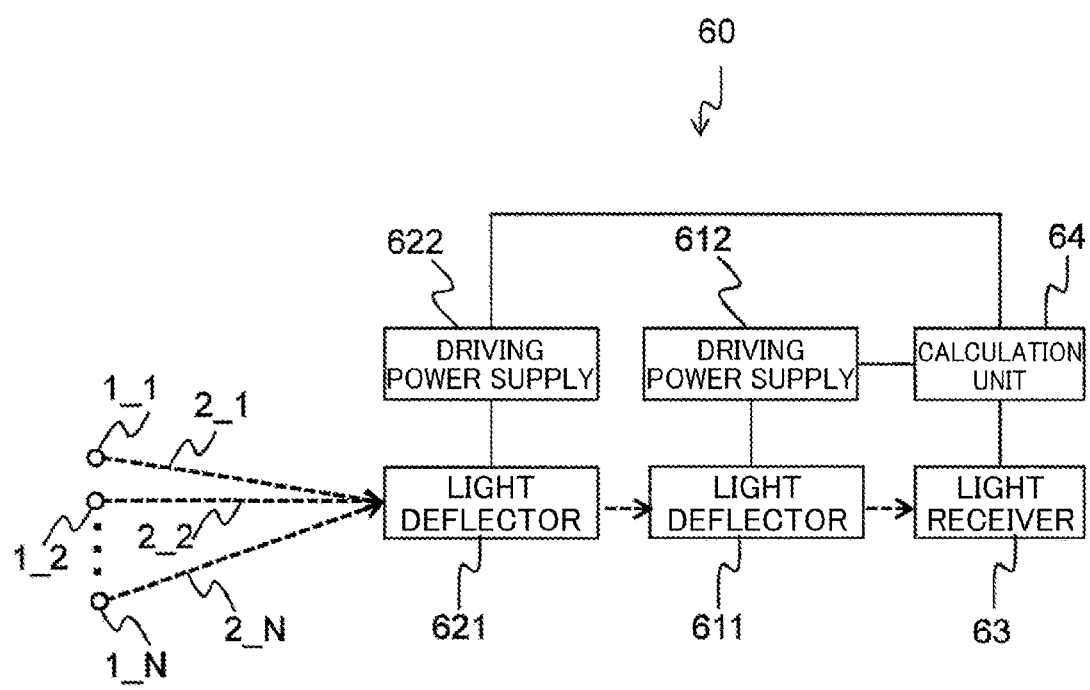
FIG. 7 is a block diagram illustrating a configuration of an angle measurement device according to a second embodiment of the present invention.

FIG. 7 shows a configuration of the angle measurement device 60 according to the first embodiment. The angle measurement device 60 includes two light deflectors 611 and 612, two driving power supplies 621 and 622, a light receiver 63, and a calculation unit 64.

The driving power supplies 621 and 622 respectively drive the light deflectors 611 and 612.

The light receiver 63 detects light transmitted through the light deflectors 611 and 612.

The calculation unit 64 calculates incident angles θ'_1 and φ'_1, θ'_2 and φ'_2, . . . , θ'_N and φ'_N of the respective light rays 2_1, 2_2, . . . , 2_N, based on the voltages of the driving power supplies 621 and 622, and intensities detected by the light receiver 63.

Of the two light deflectors 611 and 612, one light deflector 611 changes the optical path of light to the perpendicular direction (x direction) when a voltage is applied by the driving power supply 621, as in the first embodiment.

The other light deflector 612 is a light deflector obtained by rotating the one light deflector 611 around the optical axis 3 (z axis) by 90 degrees, is arranged in front of the one light deflector 611 (on the light source side), and changes the optical path of light to the horizontal direction (y direction) when a voltage is applied by the driving power supply 622. Here, the other light deflector may be arranged rearward (light detector side) of the one light deflector.

<Function and Effect of Angle Measurement Device>

Figure 8:
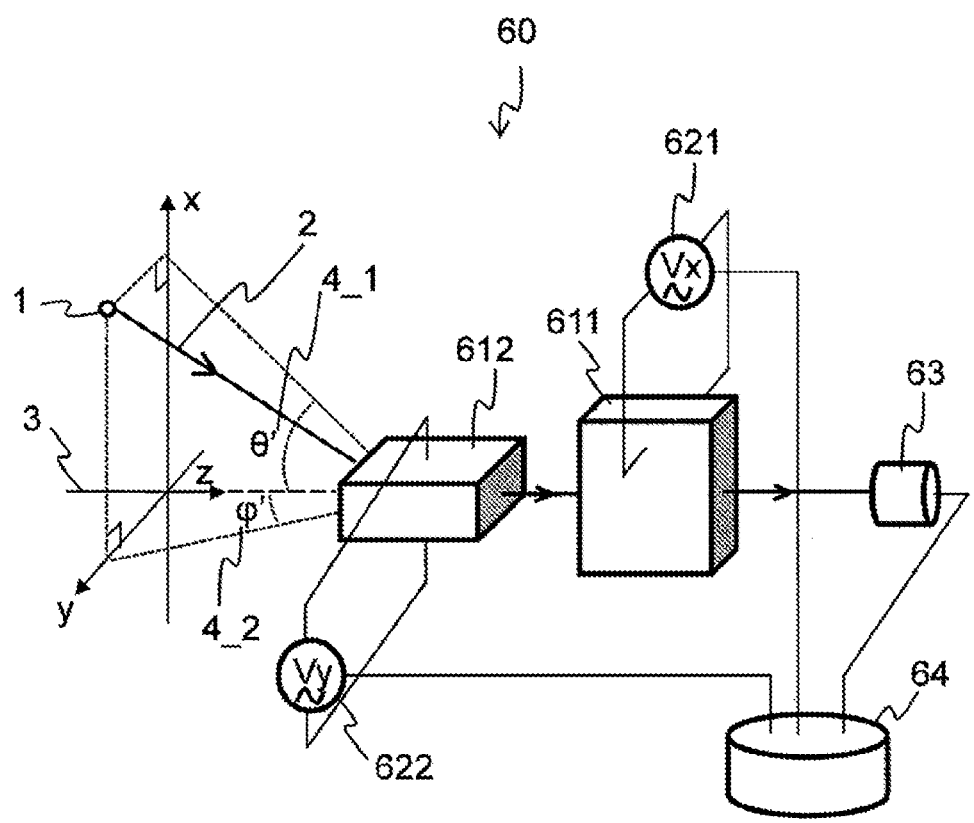
FIG. 8 is a schematic diagram illustrating the angle measurement device according to the second embodiment of the present invention.
Figure 9:
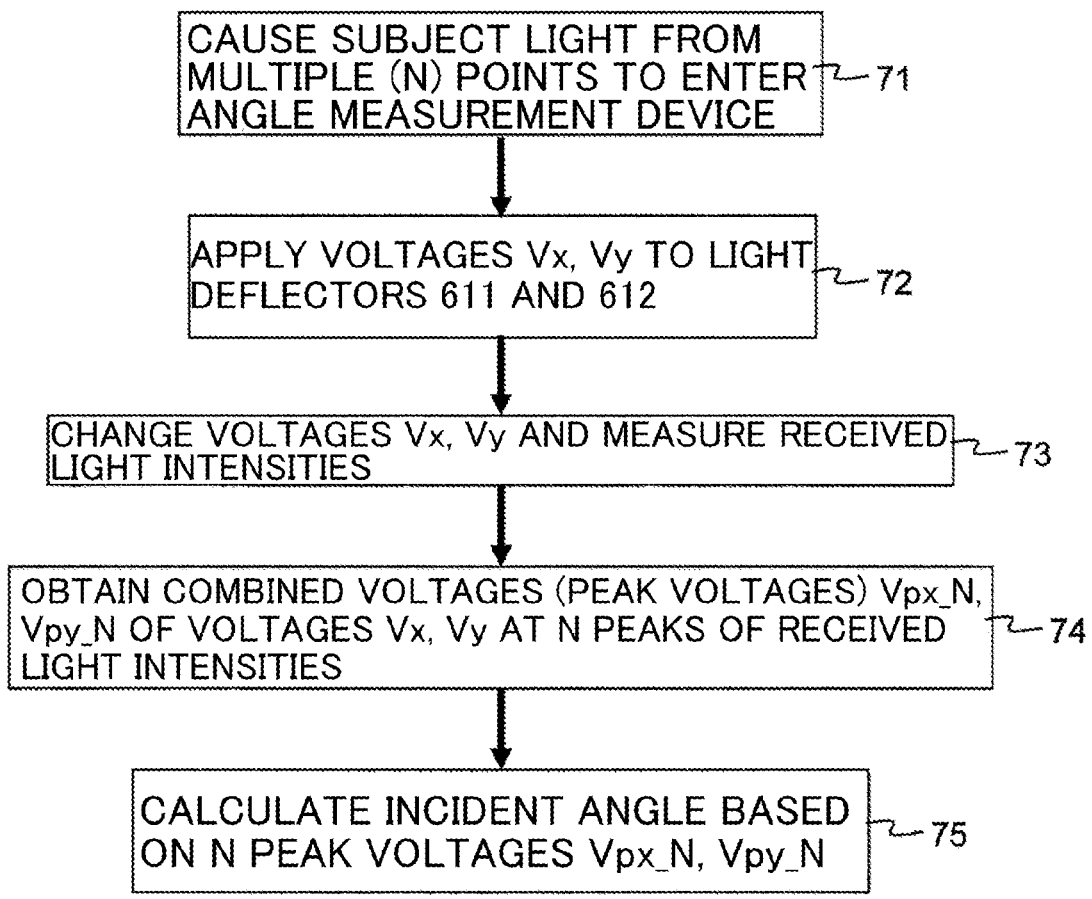
FIG. 9 is a flowchart of an angle measurement method according to the second embodiment of the present invention.

FIG. 8 is a schematic diagram showing the angle measurement device 60 according to the present embodiment. FIG. 9 is a flowchart of an angle measurement method according to the present embodiment.

First, subject light from a plurality of point light sources is caused to enter the angle measurement device 60 (step 71). Light rays 2_1, 2_2, . . . , 2_N generated from N point light sources 1_1, 1_2, . . . , 1_N provided at suitable points on an x-y plane enter the light deflector 612 at the respective angles θ'_1 and φ'_1, θ'_2 and φ'_2, . . . , θ'_N and φ'_N with respect to the z axis that is the optical axis 3.

In FIG. 7, for ease of description, a case is shown in which the light rays 2 generated from the point light source 1 provided at a suitable point on the x-y plane enter the light deflector 612 at angles θ'41 and φ'42 with respect to the z axis that is the optical axis 3. If no voltage is applied to the light deflectors 611 and 612, the light rays 2 hardly change their optical paths and respectively exit at the angles θ'41 and φ'42 with respect to the z axis.

Then, voltages Vx and Vy are respectively applied to the light deflectors 611 and 612 by the driving power supplies 621 and 622 (step 72). Due to the application of the voltages Vx and Vy, N light rays change their optical paths, and the angles of exit of the light rays are changed.

Figure 10:
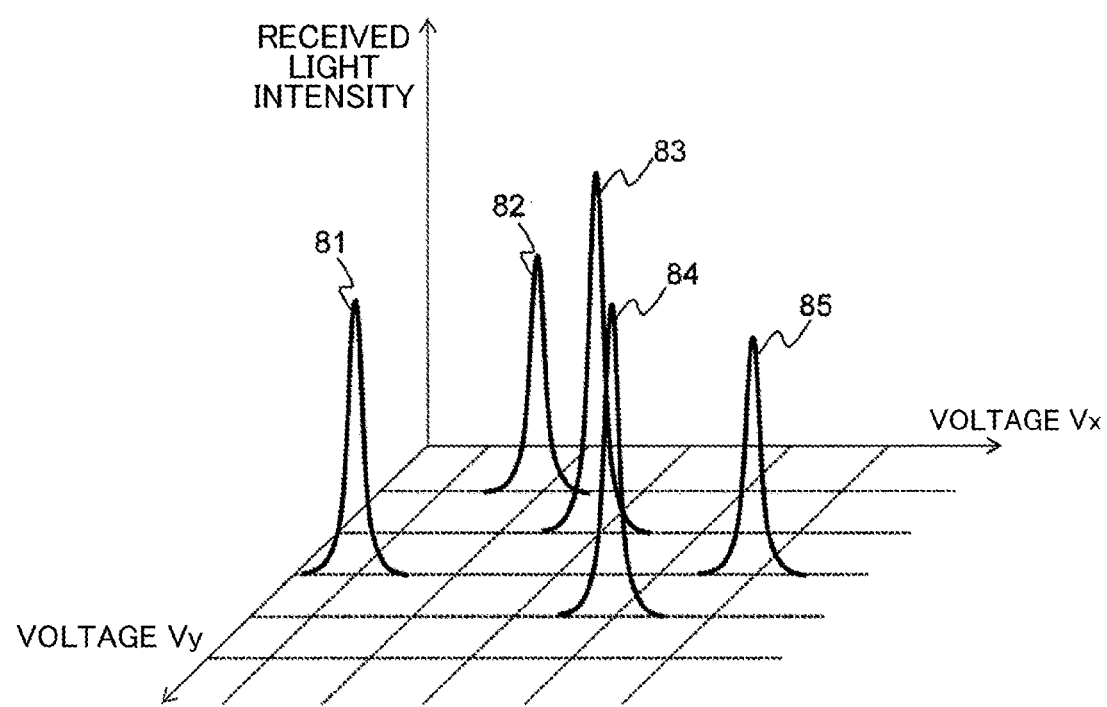
FIG. 10 is a typical diagram illustrating peaks observed by a light receiver of the angle measurement device according to the second embodiment of the present invention.

Then, by changing the voltages Vx and Vy, the optical paths of the N light rays change so as to be aligned all together with the z axis, and the N light rays are guided to the light receiver 63 provided on the z axis. Therefore, when the voltages Vx and Vy are changed and the received light intensities are measured, N peaks that correspond to the N light rays are observed (step 73). In the case of five light rays, five peaks 81 to 85 are observed as shown in FIG. 10.

Based on the voltages (peak voltages) Vx at the peaks that correspond to the respective light rays at this time, the calculation unit 64 calculates the incident angles $\theta'\_1$, $\theta'\_2, \ldots, \theta'\_N$ of the respective light rays 2_1, 2_2, ..., 2_N. Also, based on the peak voltages Vy, the calculation unit 64 calculates the incident angles $\varphi'\_1, \varphi'\_2, \ldots, \varphi'\_N$ of the respective light rays 2_1, 2_2, ..., 2_N (steps 74 to 75). For the calculation of the incident angles $\theta'$ and $\varphi'$, it is sufficient to use the applied voltage dependence of angles of light that is deflected by the KTN light deflectors 611 and 612, the angles being obtained in advance by the expression (1) or actual measurement values.

Thus, in the angle measurement device 60 according to the present embodiment, with a combination of a light deflector that changes the optical path of light to the perpendicular direction and a light deflector that changes the optical path of light to the horizontal direction, in other words, a combination of two light deflectors arranged at 90 degrees from each other with respect to the optical axis, it is possible to two-dimensionally change the optical paths of light and measure the incident angles of a plurality of light rays collectively.

Furthermore, in the angle measurement device 60 according to the present embodiment, the KTN light deflectors 611 and 612 can change the angle of deflection in response to an alternating voltage of 200 kHz, and thus can measure angles of a plurality of incident light beams (light rays) at high speed, so that angles of, for example, 100 incident light beams (light rays) can be measured at one second.

As described above, the angle measurement device 60 of the present embodiment can measure the incident angles of a plurality of incident light beams (light rays) at a higher speed with a simple configuration, without requiring any rotational mechanism for an optical element or any panel-shaped light detector, making it possible to downsize the device.

The present embodiment has described taking light emitted from N point light sources provided at suitable points on an x-y plane as an example, but the present invention is not limited to the case where the plurality of point light sources are provided on the same x-y plane. The plurality of point light sources may also be provided three-dimensionally, instead of being provided on the same x-y plane. If light from each light source passes through an x-y plane and enters the angle measurement device, an angle is calculated in the present embodiment based on a peak voltage without using the absolute value of a detected intensity, and thus it is possible to regard the light as light from a point light source on this x-y plane.

In the present embodiment, the two light deflectors are arranged at 90 degrees with respect to each other, but the present invention is not limited thereto. Instead of 90 degrees, any predetermined angle may also be used. It is sufficient that the light deflectors are arranged so that the directions of angles of deflection (hereinafter, referred to as "deflection directions") are different. If the angle between a plurality of light deflectors is determined, a solid incident angle can be calculated based on a plurality of angles that are calculated by the respective light deflectors. Here, in a case where, when a light ray that is moving in a (0, 0, 1) direction is deflected to a (x, y, 1) direction, x coordinates and y coordinates are different from each other, it is expressed as "the deflection directions being different".

In the present embodiment, the two light deflectors are arranged, but the present invention is not limited thereto. The number of light deflectors is not limited to two, but it is sufficient that a plurality of light deflectors are arranged so that their deflection directions are different. If a plurality of light deflectors are arranged so that their deflection directions are at a predetermined angle to each other, it is possible to calculate incident angles with more accuracy. Also, if the deflection direction of one of a plurality of light deflectors is different from that of another light deflector, the same effects can be realized.

According to the present embodiment, the remaining light deflectors are not necessarily the same light deflector (characteristics) as the one light deflector (characteristics), and may have different characteristics such as the deflection angle per unit voltage.

Example

Figure 11:
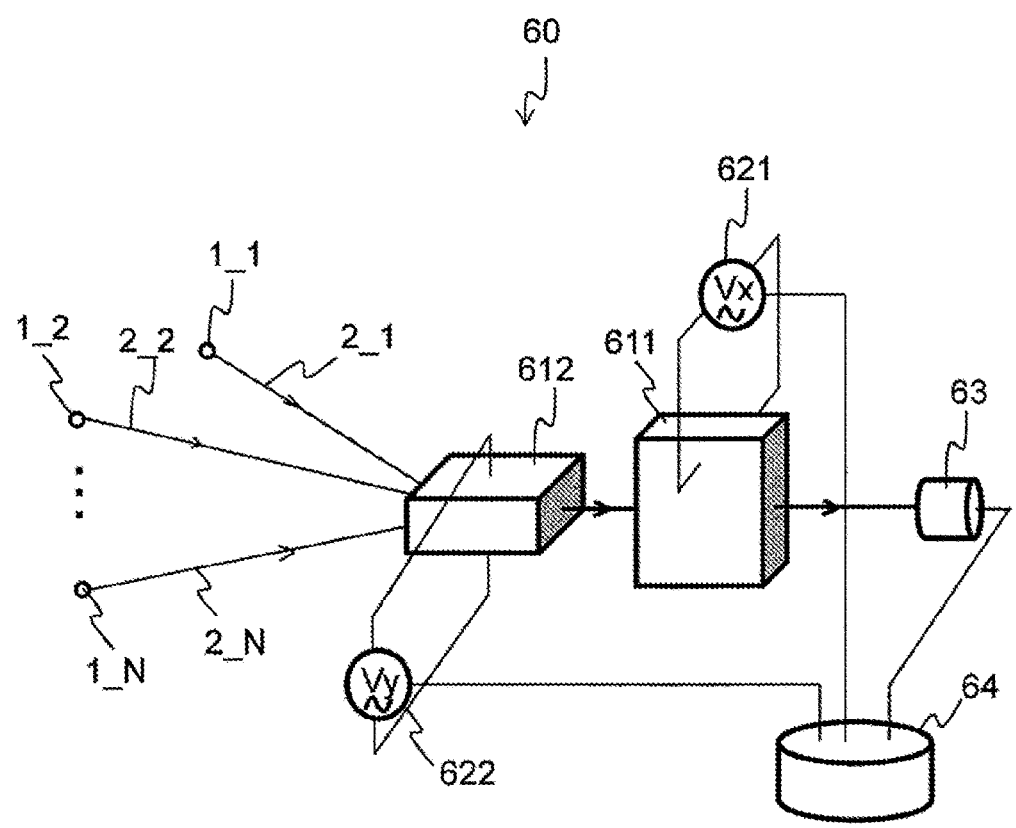
FIG. 11 is a schematic diagram illustrating the angle measurement device according to the embodiments of the present invention.
Figure 12:
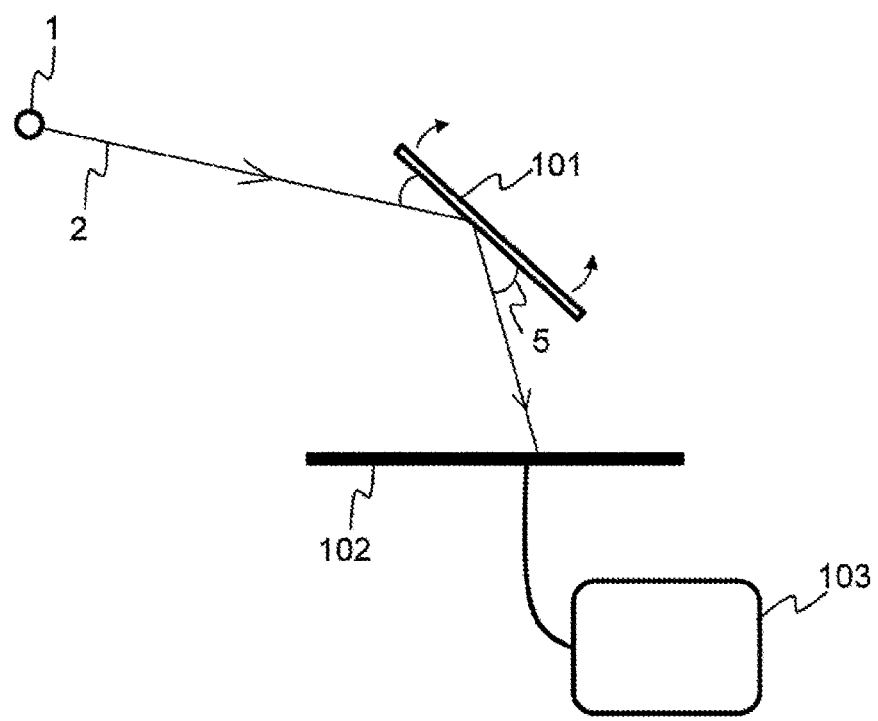
FIG. 12 is a typical diagram illustrating an example of a conventional angle measurement device.
Figure 13:
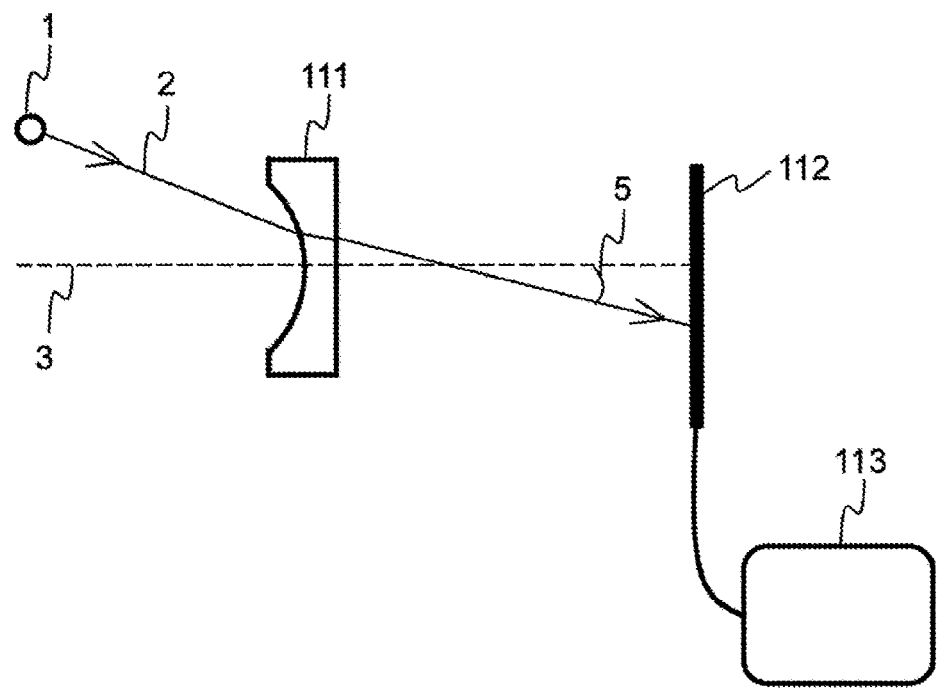
FIG. 13 is a typical diagram illustrating an example of a conventional angle measurement device.

FIG. 11 shows an example in which the angle measurement device 60 according to the second embodiment is used to measure angles of a plurality of fixed stars. In the present example, the angle measurement device 60 is mounted on an artificial satellite. Since the angle measurement device 60 according to the second embodiment can be downsized in a simple configuration, it can be mounted on an artificial satellite.

When the angle measurement device 60 is mounted on an artificial satellite such that a reference surface of the angle measurement device 60 is matched with a reference surface of the artificial satellite, the angle measurement device 60 can continuously detect favorable angles. Here, the reference surface of the artificial satellite may be matched with a reference surface of another sensor mounted on the artificial satellite.

In the present example, the angle measurement device can be used to measure angles of 100 fixed stars at one second, and thus can measure angles of fixed stars more than about double digits as many as in a conventional angle measurement device at one second.

As other examples of the angle measurement device according to embodiments of the present invention, cases are conceivable in which various inclination angles (surface conditions) of an object surface are measured based on a large number of reflected light beams from the object surface, and in which the movement of a human body, a machine, or the like is measured based on angles of light from a large number of light sources attached to a surface of the human body, the machine, or the like, for example.

In the embodiment according to the present invention, an example is taken in which KTN is used for the light deflectors, but the present invention is not limited thereto. Substantially the same effect can be realized even if barium titanate ($BaTiO_3$: BT), potassium tantalate ($KTaO_3$: KT), or strontium titanate ($SrTiO_3$: ST) is used as a substance that exhibits the Kerr effect, which is an electro-optic effect.

The same effect can also be realized even if light deflectors each using one of KTN, BT, KT, and ST are used in combination as the light deflectors provided on optical axes arranged in series or parallel to each other.

Here, "series" means an arrangement such that one light ray passes through a plurality of optical elements (such as light deflectors). On the other hand, "parallel" means an arrangement such that one light ray is branched into a plurality of light rays, and the plurality of light rays pass through a plurality of optical elements (such as light deflectors).

Also, any substance, without being limited to KTN, may be used for the light deflectors according to the embodiment of the present invention as long as it has an electro-optic effect, and substantially the same effect can be realized even if a substance that has the Pockel's effect in which a refractive index changes in proportion to an applied voltage. As the substance that has the Pockel's effect, lithium niobate (LiNbO3; hereinafter abbreviated as "LN") may be used, or lead lanthanum zirconate titanate ((Pb1−xLax)(Zry Ti1−y) 1−x/4O3: PLZT)) may also be used.

Also, substantially the same effect can be realized even if an acousto-optical element using LN or the like is used as the light deflectors of the embodiment according to the present invention.

Although, in the embodiment according to the present invention, an example is taken in which the light deflectors and the light receiver, and the plurality of light deflectors are arranged on substantially the same optical axis parallel to the horizontal direction, the present invention is not limited thereto. They may be arranged on, instead of the optical axis parallel to the horizontal direction, an optical axis that is at a predetermined angle ψ with respect to the horizontal direction. In this case, the angles may be calculated taking into consideration the angle difference ψ from the horizontal direction.

Also, the light deflectors and the light receiver may not necessarily be arranged on the substantially the same optical axis. In this case, the angles may be calculated taking into consideration a difference from the optical axis in the actual state in which the light deflector and the light receiver are arranged. It is sufficient for the light deflectors to be arranged within a range such that an outgoing light ray can enter the light receiver.

Similarly, if the plurality of light deflectors are not arranged on substantially the same optical axis, it is sufficient to calculate the angles taking into consideration a difference from the optical axis in the actual state in which the light deflectors are arranged. It is sufficient for the light deflectors to be arranged within a range such that a light ray exited from one light deflector can enter another light deflector. Accordingly, it is sufficient for the plurality of light deflectors to be arranged in series to each other.

In the embodiment of the present invention, an example is taken in which two light deflectors are arranged in series to each other, but the present invention is not limited thereto. A plurality of light deflectors may be arranged in parallel to each other. In this case, it is also possible to increase the measurable angle (incident angle).

The embodiments of the present invention have described examples of configurations, sizes, materials, and the like of the constituent components, with respect to the configuration of the angle measurement device and the method. But the present invention is not limited thereto. Any configuration, size, material, and the like may be used as long as they exhibit the functions and effects of the angle measurement device and the method according to the present invention.

INDUSTRIAL APPLICABILITY

Embodiments of the present invention are applicable to an astronomical measurement device for measuring an angle of light from a fixed star, an object surface evaluation device, and the like.

REFERENCE SIGNS LIST

10 Angle measurement device
1 Measurement target (light source)
2 Light ray
3 Optical axis
4 Incident angle
11 Light deflector
12 Driving power supply
13 Light receiver
14 Calculation unit.

The invention claimed is:

1. An angle measurement device for measuring an incident angle of an incident light ray, comprising:
    one or more light deflectors which is of a transmission type and has an electro-optic effect;
    a driving power supply configured to apply a voltage to the one or more light deflectors;
    one or more light receivers; and
    a processor, wherein the one or more light deflectors is configured to change an optical path of the incident light ray by the voltage applied from the driving power supply, so as to cause the incident light ray to enter the one or more light receivers, and wherein the processor is configured to calculate the incident angle based on the voltage at which an intensity of the incident light ray detected by the one or more light receivers is maximum.

2. The angle measurement device according to claim 1, wherein the one or more light deflectors includes a plurality of light deflectors, wherein the plurality of light deflectors are arranged in series, and wherein among the plurality of light deflectors, a deflection direction of a first one of the plurality of light deflectors is different from a deflection direction of a second one of the plurality of light deflectors.

3. The angle measurement device according to claim 1, wherein the one or more light deflectors includes a plurality of light deflectors arranged in parallel to each other.

4. The angle measurement device according to claim 1, wherein the one or more light deflectors comprises potassium tantalate niobate.

5. The angle measurement device according to claim 1, further comprising a baffle plate arranged between a light source of the incident light ray and the one or more light deflectors.

6. The angle measurement device according to claim 1, further comprising a concave lens arranged between a light source of the incident light ray and the one or more light deflectors.

7. An angle measurement method for measuring an incident angle of an incident light ray, using a transmission-type light deflector that has an electro-optic effect, the method comprising:
    a step of applying a voltage to one or more light deflectors to change an optical path of the incident light ray;
    a step of measuring an intensity of the incident light ray at a predetermined position;
    a step of obtaining a peak voltage at which the intensity is maximum; and a step of calculating the incident angle based on the peak voltage.

8. The angle measurement method according to claim 7, wherein the one or more light deflectors includes a plurality of light deflectors, wherein the plurality of light deflectors are arranged in series, and wherein among the plurality of light deflectors, a deflection direction of a first one of the plurality of light deflectors is different from a deflection direction of a second one of the plurality of light deflectors.

9. The angle measurement method according to claim 7, wherein the one or more light deflectors includes a plurality of light deflectors arranged in parallel to each other.

10. The angle measurement method according to claim 7, wherein the one or more light deflectors comprises potassium tantalate niobate.

11. The angle measurement method according to claim 7, wherein a baffle plate is arranged between a light source of the incident light ray and the one or more light deflectors.

12. The angle measurement method according to claim 7, wherein a concave lens is arranged between a light source of the incident light ray and the one or more light deflectors.

* * * * *